United States Patent [19]

Fleischer et al.

[11] 4,197,456
[45] Apr. 8, 1980

[54] FLOWMETER FOR LIQUIDS

[75] Inventors: Robert L. Fleischer; Howard R. Hart, Jr.; Antonio Mogro-Campero, all of Schenectady, N.Y.

[73] Assignee: General Electric Company, Schenectady, N.Y.

[21] Appl. No.: 921,959

[22] Filed: Jul. 5, 1978

[51] Int. Cl.² .............................................. G01T 1/161
[52] U.S. Cl. ..................................... 250/303; 250/356
[58] Field of Search ................................ 250/303, 356

[56] References Cited

U.S. PATENT DOCUMENTS

| 2,631,242 | 3/1953 | Metcalf | 250/303 |
| 2,826,700 | 3/1958 | Hull | 250/303 |
| 3,842,670 | 10/1974 | Brain | 250/356 |
| 3,889,120 | 6/1975 | Greaney | 250/356 |
| 4,064,436 | 12/1977 | Ward | 250/253 |

*Primary Examiner*—Harold A. Dixon

*Attorney, Agent, or Firm*—Leo I. MaLossi; James C. Davis, Jr.

[57] ABSTRACT

A passive device particularly for the improved measurement of the flow of a liquid is described. The device comprises a conduit defining a flow volume for the internal transit therethrough of a liquid to be received at one open end thereof and discharged from the other open end thereof; means disposed in communication with the interior of the conduit for introducing a preselected tracer substance into liquid flowing (full channel flow) through the flow volume; at least one enclosure having wall area permeable to the preselected tracer substance, this enclosure being disposed relative to the flow volume so that the liquid flow through the flow volume will contact the permeable wall area, and means disposed within the enclosure for detecting the presence of such preselected tracer substance as may enter the enclosure through the permeable wall area from the interior of the conduit.

4 Claims, 5 Drawing Figures

FLOWMETER FOR LIQUIDS

BACKGROUND OF THE INVENTION

A flowmeter and a method for determining the velocity of a fluid containing a known tracer substance having a known diffusion constant in the fluid are described in U.S. patent application Ser. No. 729,076, filed Nov. 4, 1976, now U.S. Pat. No. 4,107,525 in the name of Howard R. Hart, Jr., and assigned to the assignee of the instant invention. In the aforementioned Hart patent a fixed flux of tracer substance is introduced into the fluid in a conduit and concentrations of the tracer substance are measured as a function of position along the conduit by detectors, the tracer substance itself never leaving the confines of the conduit.

DESCRIPTION OF THE INVENTION

In order to facilitate the description of the instant invention, certain terms are defined as follows:

The term "tracer substance" hereinafter designates an identifying molecule, atom or group of atoms from which detectable radioactive emanations occur.

Thus, a tracer substance may itself have the capability for releasing detectable radioactive emanations, or may have been provided with this property by means of tagging (i.e., chemical integration thereinto of a radioactive isotope).

In order to utilize any given tracer substance, its diffusion constant in the liquid, the flow of which is being measured, must be known or determinable. Exemplary tracer substances are radon-220, tritium ($^3$H) and carbon 14 ($^{14}$C) in $CO_2$.

This invention is of particular value for use with those tracer substances in which the product of (a) the effective range (or penetrating power) of the radioactive emanations (i.e., decay products) in the liquid whose velocity is to be measured and (b) the population density of the tracer substance in the liquid is less than one-tenth of the comparable product in air. When such tracer substances are used to measure the flow of liquids, the signal level detectable in the liquid environment is lowered considerably. Thus, in the case of the use of radon-222 (Rn-222) as the tracer substance in water the signal level is less by a factor of about 1000 than the signal level in air. This reduction occurs because of the much lower concentration per unit mass of Rn-222 in water as compared to air. Stated another way, even though the concentration per unit volume of Rn-222 in water is comparable to that in air, the range in water of alpha particles emitted by the Rn-222 is only about one one-thousandth of the range of these alpha particles in air, lowering the signal level accordingly. By the practice of this invention this sort of reduction in signal level is obviated by providing for movement of the alpha particles (or other radiation from a tracer substance) in an ambient of air.

The flowmeter device of this invention is also a low impedance, low-flow rate meter that may be made and operated without need for power input and, under certain operating conditions using radioactive tracer substances, may be self-calibrating. The device comprises a conduit defining a flow volume for conducting liquid flow therethrough; means disposed in communication with the interior of the conduit for introducing a preselected tracer substance into liquid flowing (full channel flow) through the flow volume; at least one enclosure having wall area permeable to the preselected tracer substance, this enclosure being disposed relative to the flow volume so that the liquid flow through the flow volume will contact the permeable wall area, and means disposed within the enclosure for detecting the presence of such preselected tracer substance as may enter the enclosure through the permeable wall area from the interior of the conduit.

In the usual arrangement a plurality of such enclosures having a buffer of air through which the tracer substance reaches the detecting means are located along the conduit with the source of the tracer substance disposed upstream thereof. The readouts from the detectors in these enclosures will reflect the density distribution of tracer substance previously introduced into the liquid, that has left the liquid in the conduit and has diffused into the air volume in each of the various enclosures. These readouts as a function of the location of the entries to the enclosures at various stations downstream of the source of the tracer substance provide a density profile. Certain mathematical relationships make it possible for a conduit of uniform cross-section (as is described hereinafter) to utilize information from the density profile to calculate the velocity of the liquid flow.

In the preferred embodiment in which a source of radon-222 is used as the source of the tracer substance, the entrance to each enclosure (i.e., the area permeable to the radon-222) is closed off by a suitable polymer membrane, which keeps the liquid out of the enclosure regardless of the position in which the enclosure is disposed relative to the force of gravity and also, in effect, functions as a "barrier" to the passage of thoron (Rn-220), that may be present, therethrough relative to the passage of Rn-222 therethrough. This provision allows a simpler, more useful signal to be recorded and permits the use of an impure source, e.g., uranium ore. Suitable membranes are described in U.S. Pat. No. 4,064,426—Ward incorporated by reference.

The invention finds particular utility in the determination of liquid flow velocities in the range of from about $3 \times 10^{-6}$ cm/sec to about $2 \times 10^{-2}$ cm/sec. Depending upon the mode of operation and the tracer/liquid combination significantly larger velocities can be measured. Measurements of small flows will be of interest in geophysical research in determining the velocities of terrestrial liquid flows.

In general there are two types of devices encompassed within this invention as broadly described hereinabove. The first type has the enclosure(s) disposed so that the wall area thereof through which the tracer substance can pass is located at the wall of the conduit. In the second type, the enclosure(s) is so located that it presents the wall area through which the tracer substance can enter that enclosure within the flow volume, preferably at or near the centerline of the conduit. In both types an opening is provided interconnecting the flow-volume and each enclosure. With the first type, such opening may remain open, or may be closed off with a suitable membrane. In the second type the opening will usually be closed off by a membrane.

Detectors for use in this invention will vary depending upon the nature of the tracer substance and upon the method of detection of the tracer. In each case, the detector should be capable of providing a reliable record of the incidents of tracer arrivals at that given station along the conduit and should preferably be inert to the particular fluid flow being measured.

Since the tracer substance is to be radioactive, the radioactivity to be detected may be alpha, beta, or gamma radiation. Detectors for any of these types of radiation are well known. The detectors may be active and powered, or passive and not requiring power. In the case in which the tracer substance is an alpha particle-emitting gas, the detectors may be electronic detectors, etched-track detectors or photographic film, for example. Gamma rays can be detected by conventional gamma ray counters comprising a tubing having a scintillator crystal at the aperture end and a photocathode at the output end. Both gamma rays and beta radiation can be detected by the use of photographic emulsions. A conventional beta ray counter may be used for detecting beta radiation, such a counter comprises a sealed gas-filled tubing having an electrode therein connected to a source of relatively high voltage such that the beta rays ionize the gas and each gas ionization event is detected by an electronic amplifier and readout device.

When etched-track detectors are employed to record the events of alpha particle impingement thereon, if the dimensions of any given enclosure are not such that a sufficiently thick volume of air must be traversed by the alpha particles released thereby before they reach the track detector material, it may be necessary to secure a thin cover film over the track detector material in order to slow down the alpha particles. A suitable material would be a layer of Mylar ® plastic about 0.002 cm. thick.

Solid state track-registration material for the detection of alpha particles is described in U.S. Pat. No. 3,665,194—Alter et al. Also, the manner of processing of the exposed track-registration material is described therein. This patent is incorporated by reference.

BRIEF DESCRIPTION OF THE DRAWING

The features of this invention believed to be novel and unobvious over the prior art are set forth with particularity in the appended claims. Understanding of the following description setting forth the manner and process of making and using the invention, the best mode thereof and the more general description of the invention set forth hereinabove is facilitated by reference to the accompanying drawing wherein:

MANNER AND PROCESS OF MAKING AND USING THE INVENTION

In the best mode contemplated for this flowmeter the generator of the tracer substances is a radioactive material and the device employs passive detecting means. The following description relates to such a structure. However, the invention is not so limited.

Figure 1:
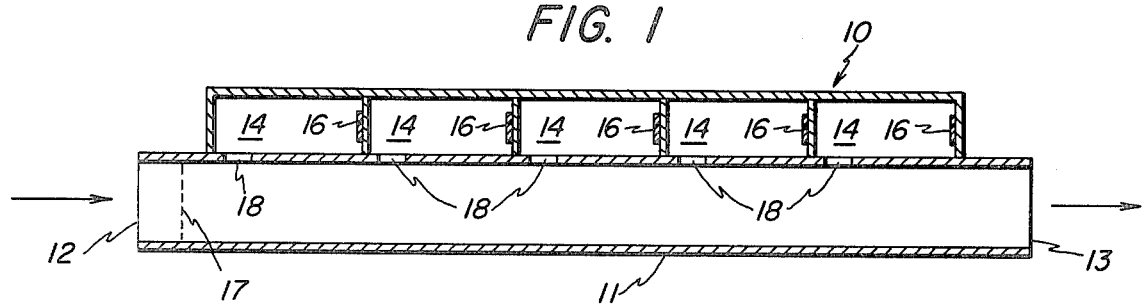
FIG. 1 is a schematic illustration of one embodiment of this invention.

In the schematic representation of FIG. 1 liquid flowmeter 10 (the flow of liquid therethrough being designated by arrows on the drawing) comprises a conduit 11, inlet 12, outlet 13, enclosures 14, each containing a detector 16, and source 17 of radiation-emitting tracer gas. Although, in principle, source 17 could be located with enclosures 14 and detectors 16 upstream thereof as well as downstream as illustrated, in a practical device for determining the flow of liquids the smaller diffusion coefficient of the tracer in liquids makes it more appropriate to emphasize data collected downstream as shown.

The length of conduit 11, which may be straight or bent into some convenient shape for ease of packaging, or to achieve greater length, will depend upon the half life of the radioactive tracer introduced at the source 16. Thus, an aluminum tube 6 to 12 feet long may readily be employed in connection with a uranium-238 source yielding randon-222 for which the half life is 3.82 days. For velocities of liquid flow in excess of about $2 \times 10^{-2}$ cm/sec longer conduit lengths will be necessary. The decay product of radon-222 is alpha particle radiation, which preferably can be detected by the series of allyl diglycol carbonate etched-track detectors 16 shown, once the radon-222 has left the liquid flow and has entered the air volume in the enclosures 14 through openings 18.

In use, the embodiment shown in FIG. 1 must be oriented so that gravity will keep water below the air trapped in the enclosures 14 and below the detectors 16.

Figure 2:
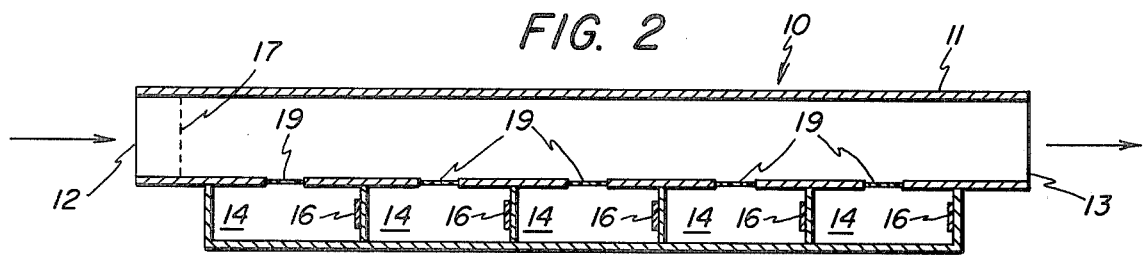
FIG. 2 is a schematic illustration of a preferred embodiment.

The need for orientation in this manner is obviated by the construction shown in FIG. 2. Non-porous permeable membranes 19 (with approriate support screens, etc., not shown) close off the openings through the wall of conduit 11 and keep water out of the enclosures. Also, as is described in the Ward patent referred to hereinabove, radon-222 is permitted to permeate through these membranes while removing the thoron (radon-220) signal.

Consideration only of data collected in the downstream direction at steady state conditions will produce as the mathematical expression, which serves as the basis for determining the velocity of the liquid flow, the following equation:

$$\dot{\rho}(x) = \frac{f\lambda\phi_o}{(v^2 + 4D\lambda)^{\frac{1}{2}}} \cdot \exp(-x/L), \quad (1)$$

where
- x is the distance downstream from the source of of the tracer
- t is the time of exposure of the detector(s), usually at least 2 weeks
- v is the velocity of the liquid flow
- λ is the radioactive decay rate of the tracer substance (the value for radon-222 is $2.1 \times 10^{-6}$ sec$^{-1}$)
- D is the diffusion coefficient of the tracer substance in the liquid (the value for radon-222 in water is $1.13 \times 10^{-5}$ cm$^2$/sec)
- $\phi_o$ is the rate of introduction of the tracer substance, i.e., the number of atoms per unit area of cross-section of the conduit per unit time at x=0
- $L^{-1}$ is the slope of the straight line curve resulting from the plot of log ρ vx. x and is equal to $$\frac{(v^2 + 4D\lambda)^{\frac{1}{2}} - v}{2D}$$

- ρ(x) is the density of tracer substance disintegrations recorded at position x
- $\dot{\rho}(x)$ is the rate of increase in density of tracer substance disintegrations recorded at position x f is a factor relating the recorded rate of increase of density $\dot{\rho}(x)$ to the number of tracer substance disintegrations occurring per unit volume at x per unit time.

In operation, values of $\rho$ and x are recorded. The values of $\rho$ are divided by t ($\dot{\rho}=\rho/t$) and these results, together with the values of x are plotted on semi-logarithmic graph paper (i.e., log $\rho$ vs. x) yielding a straight-line curve. With the line so generated various approaches can be used to determine the velocity using the flowmeter of this invention.

In one such approach the semi-logarithmic plot is used for calculating the slope of the log $\dot{\rho}$ vs. x line, which yields the value of 1/L and, therefrom the value of L. The velocity is then obtained from the following equation derivable from the relationships above:

$$v = \lambda L - D/L \qquad (2).$$

No calibration is required; both $\lambda$ and D should be known quantities. The range of velocities for which this approach is useful depends upon the distance x over which $\dot{\rho}$ can be measured. With a conduit length of two meters (i.e., a practical laboratory or field apparatus), using radon as the tracer substance and assuming water as the liquid flow the upper limit on reliable velocity information obtainable is about or less than $2 \times 10^{-2}$ cm/sec. Using a much longer length conduit (i.e., straight or serpentine) the upper limit could be extended considerably.

The lower limit for the measurable velocity is set by the v=0 limit of $L^{-1}$; that is $L^{-1}_{(v=0)} = (\lambda/D)^{\frac{1}{2}}$. Once again using radon in water, the lower limit, which one can obtain for this approach is about $3 \times 10^{-6}$ cm/sec.

In a second such approach, after plotting the log $\dot{\rho}$ vs. x line, this line is extrapolated back to x=0 to obtain the value of log $\dot{\rho}(0)$. From equation (1) above the following relationship can be derived:

$$v = \left[ \left( \frac{f\lambda \dot{\phi}_*}{\dot{\rho}(O)} \right)^2 - 4D\lambda \right]^{\frac{1}{2}}$$

This approach is especially useful for $v \leq (D\lambda)^{\frac{1}{2}}$ and for radon in water will serve to determine velocities greater than $5 \times 10^{-6}$ cm/sec. One disadvantage of this approach is that the flowmeter must be calibrated at full channel flow (i.e., with the available flow volume full of liquid) at at least one velocity, for example at zero velocity.

The above measurement approaches are useful when the product of the conduit diameter and velocity is appreciably less than $8\sqrt{3D}$. For example, for randon and water using a 1 cm diameter conduit the condition is satisfied when the velocity is appreciably less than $1.5 \times 10^{-4}$ cm/sec.

Figure 3:
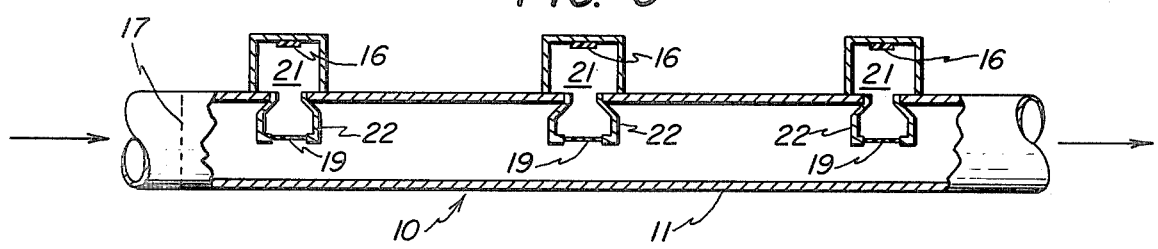
FIG. 3 is a schematic illustration of still another preferred embodiment.

In the case of larger conduit sizes or for larger velocities the flowmeter must be calibrated throughout the range of velocities of interest. It is desirable to use a conduit having a radius of less than about $(D/\lambda)^{\frac{1}{2}}$, or as an alternative, the construction shown in FIG. 3 can be used. In the former arrangement using radon to determine water flows, the value of the radius should be less than about 2.3 cm on this basis.

In the latter construction in which elements of construction like those shown in FIGS. 1 and 2 are designated by like numerals (only a portion of the flowmeter is shown) enclosures 21 are provided having portions 22 thereof extending into the flow channel degined by conduit 11. Each of portions 22 has an opening at the far end thereof closed off by membrane 19, the length of each extension 22 being such that the membrane-covered openings to enclosures 21 are disposed at or near the center of conduit 11.

Still another alternative construction for use in larger conduits can utilize a longitudinally-extending structure to which would be affixed in series the tracer source and a plurality of separate hollow, air-filled chambers. Each chamber (i.e., enclosure) would contain the requisite detector and would have part of its wall area permeable to the tracer substance. Such a structure could be inserted into the conduit, permitted to remain for the requisite period and then removed for readout. In such an arrangement preferably the chambers would be disposed along the conduit centerline.

Figure 4:
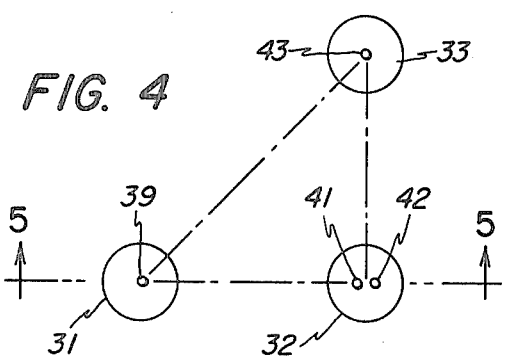
FIGS. 4 and 5, which are interrelated, display the technique for determining three components of flow velocity of water in the earth.
Figure 5:
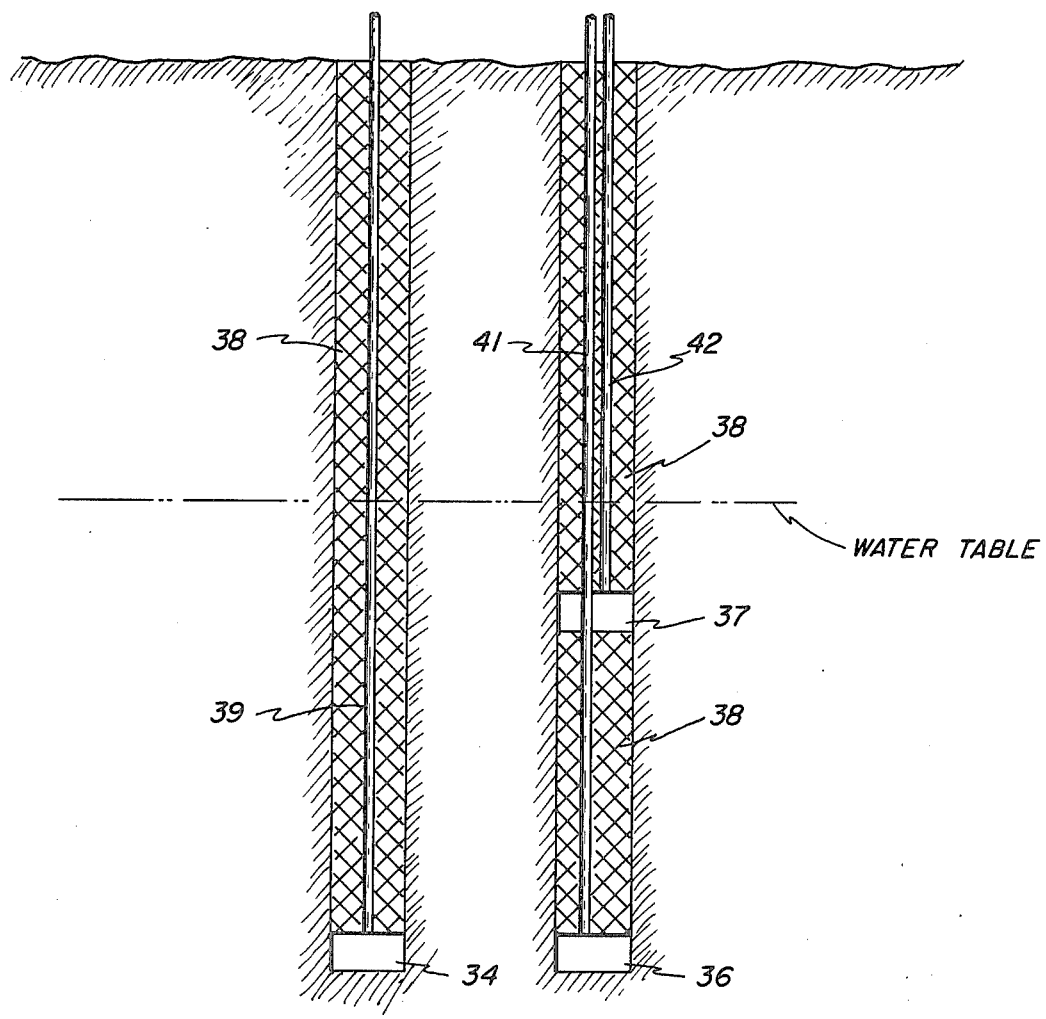

FIGS. 4 and 5 display an arrangement in which the flowmeters of this invention can be employed to measure the velocity of ground water. Three shafts 31,32,33 are sunk to extend far enough down so that all loci intended to yield information will be located below the water table. These shafts, or drill holes, are spaced about 25 feet apart in the right triangular disposition shown. Discrete volumes (i.e., chamber) 34,36 (and a third not shown behind volume 36) are defined approximately in a plane by being located at the bottom of shafts 31,32,33, respectively. In addition, in shaft 32 an additional discrete volume 37 is provided. Definition of these volumes as shown is provided by the use of packers, or plugs, 38 well-known in the drilling art. Pipelines 39,41,42,43 provide independent access to each of discrete volumes 34,36,37, and the discrete volume at the bottom of shaft 33, respectively. By interconnecting pipelines 39 and 41, 41 and 43, 41 and 42 with pipes, not shown, and having a flowmeter of this invention in each such pipe, velocity vectors would be determined for horizontal and vertical flows, which can then be combined into a single resultant velocity.

The best mode contemplated for the invention is the use of an alpha particle-emitting gas as the tracer.

The operating procedure for flowmeter 10 requires that the diffusion constant for the tracer substance in the liquid, the velocity of flow of which is to be determined, must be known, or determinable.

We claim:

1. A device for measuring the flow of a liquid comprising in combination:
    a longitudinally extending conduit defining a flow volume, said conduit having the opposite ends thereof open in order to receive liquid flow into one of said ends and to discharge liquid flow from the other of said ends;
    means in communication with the interior of said conduit for introducing radon-222 tracer gas into said flow volume;
    at least one gas containing enclosure having wall area comprising a polymer membrane impermeable to liquid of the liquid flow volume but through which said tracer gas can pass into gas volume within the enclosure, said at least one enclosure being disposed relative to said flow volume so that some part of the liquid flow in said flow volume will contact said wall area; and
    means disposed within said at least one enclosure and in contact with said gas volume therein for detecting the presence of such of said tracer gas as may enter said gas volume within said at least one enclosure from liquid flow in said flow volume.

2. The liquid flowmeter device recited in claim 1 wherein the means for introducing a preselected tracer substance is disposed in the conduit adjacent the end thereof in which the liquid flow is received.

3. The liquid flowmeter device recited in claim 1 wherein the at least one enclosure projects into the flow volume and the wall area through which the tracer substance can pass is disposed at a location near the centerline of the conduit.

4. The liquid flowmeter device recited in claim 1 wherein a series of spaced enclosures is provided along the conduit and each said enclosure is filled with air.

* * * * *